(12) United States Patent
Peng et al.

(10) Patent No.: US 8,531,776 B2
(45) Date of Patent: Sep. 10, 2013

(54) ZOOM LENS SYSTEM

(75) Inventors: Fang-Ying Peng, Taipei Hsien (TW); Hai-Jo Huang, Taipei Hsien (TW); Sheng-An Wang, Taipei Hsien (TW); Xiao-Na Liu, Guangdong (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 341 days.

(21) Appl. No.: 12/973,790

(22) Filed: Dec. 20, 2010

(65) Prior Publication Data

US 2012/0105973 A1 May 3, 2012

(30) Foreign Application Priority Data

Oct. 27, 2010 (CN) .......................... 2010 1 0521617

(51) Int. Cl.
 *G02B 15/177* (2006.01)
 *G02B 13/04* (2006.01)
(52) U.S. Cl.
 CPC .............. *G02B 15/177* (2013.01); *G02B 13/04* (2013.01)
 USPC .......................................... 359/682; 359/689
(58) Field of Classification Search
 CPC .............................. G02B 15/177; G02B 13/04
 USPC ................................................. 359/682, 689
 See application file for complete search history.

(56) References Cited

U.S. PATENT DOCUMENTS

| 7,212,349 | B2 * | 5/2007 | Mitsuki | 359/682 |
| 7,277,233 | B2 * | 10/2007 | Satori | 359/682 |
| 7,457,050 | B2 * | 11/2008 | Betensky | 359/691 |
| 2010/0309339 | A1 * | 12/2010 | Yoshitsugu et al. | 359/682 |

FOREIGN PATENT DOCUMENTS

| CN | 101135767 A | 3/2008 |
| WO | WO 2009096153 A1 * | 8/2009 |

* cited by examiner

*Primary Examiner* — Zachary Wilkes
(74) *Attorney, Agent, or Firm* — Altis Law Group, Inc.

(57) ABSTRACT

A zoom lens system includes, from the object-side to the image-side thereof, a first lens group, a second lens group, and a third lens group. The first lens group includes a first lens and a second lens. The second lens includes a third lens, a fourth lens, and a fifth lens. The fourth lens and the fifth lens are attached to each other. The third lens group includes a sixth lens. The zoom lens system satisfies the following conditions: $0.35<f2/f3<0.7$; $1.8<|f45/Fw|<3$; $0.5<|f1|/Ft<0.9$; $0.7<f3/Ft<1.2$, wherein: f1 is a focal length of the first lens; f2 is a focal length of the second lens; f45 is a focal length of the attached fourth lens and fifth lens; Fw is a focal length of the zoom lens system at a wide-angle end; Ft is a focal length of the zoom lens system in a telephoto state.

11 Claims, 13 Drawing Sheets

ZOOM LENS SYSTEM

BACKGROUND

1. Technical Field

The disclosure relates to lens systems and, particularly, to a zoom lens system.

2. Description of Related Art

There is a field of lens technology where a short overall length is demanded for use in lens module for image acquisition. The lens module is mounted in relatively thin equipment, such as simple digital cameras, webcams for personal computers, and portable imaging systems in general. In order to satisfy this demand of compact lens system, conventional lens systems reduce the number of lenses to short the overall length, but resolution will suffer. Increasing the number of lenses can increase resolution, but will also increase the overall length of the lens systems.

In a zoom lens system, good image quality and compact size is required for portability. Therefore, it has become necessary to develop a zoom lens system with a short overall length and an optical performance that matches image sensing chips having enhanced resolution.

What is needed, therefore, is a zoom lens system to overcome the above-described problem.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the disclosure will now be described in detail below, with reference to the accompanying drawings.

Figure 1:
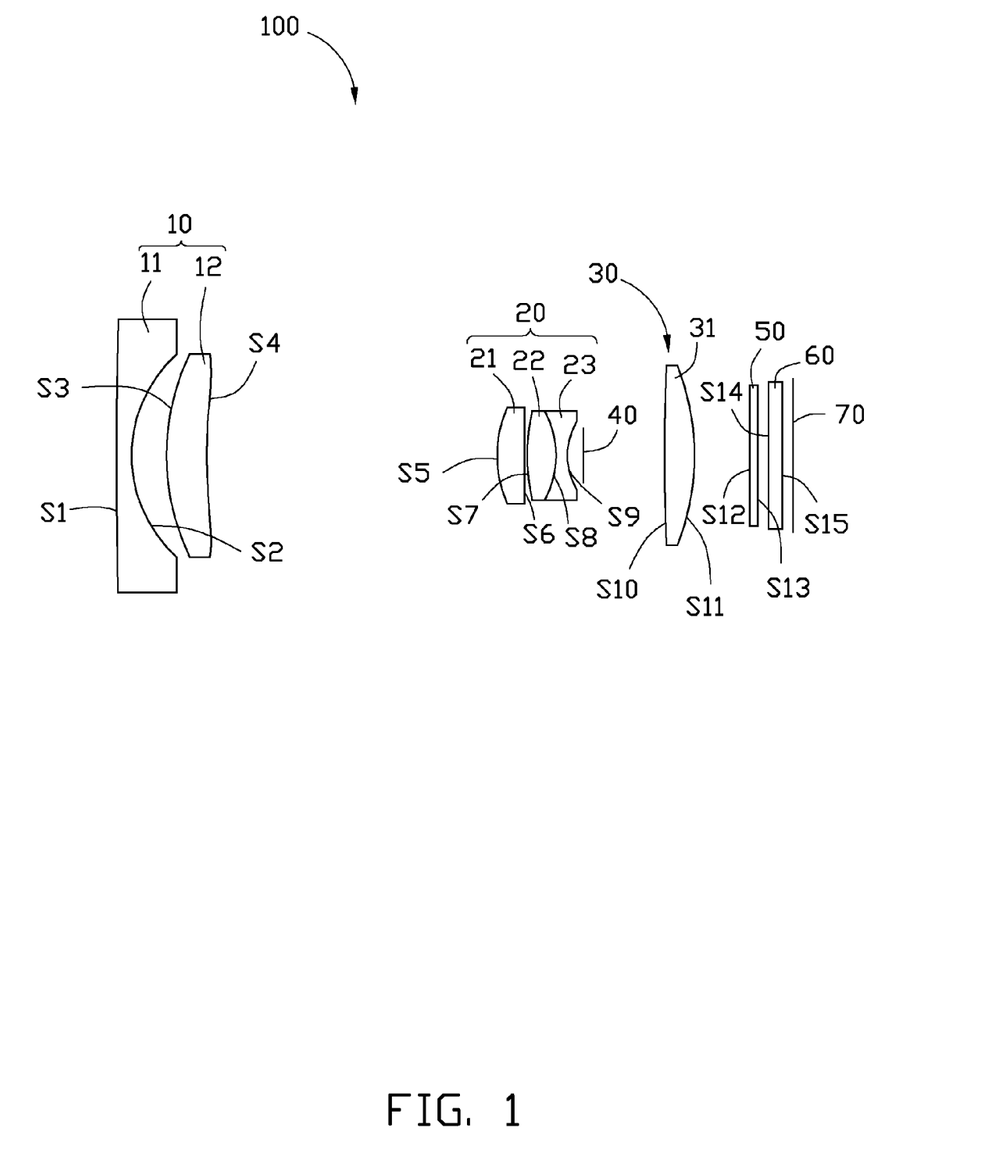
FIG. 1 is a schematic view of a zoom lens system of the present disclosure.

Referring to FIG. 1, a zoom lens system 100 of the present disclosure is used for imaging an object to an image plane 70. The zoom lens system 100 includes, in this order from the object-side to the image-side thereof, a first lens group 10 with negative refraction power, a second lens group 20 with positive refraction power, a third lens group 30 with positive refraction power, a color filter 50, and a transparent glass sheet 60. The lens groups 10, 20, and 30 are movably positioned. Thereby, the effective focal length of the zoom lens system 100 can be adjusted by moving the lens groups 10, 20, 30 along the optical axis thereof. As a result, uniformity of imaging quality can also be obtained by adjusting positions of the lens groups 10, 20, 30.

In the embodiment, the first lens group 10 includes, in this order from the object-side to the image-side of the zoom lens system 100, a first lens 11 having negative refraction power and a second lens 12 having positive refraction power. The first lens 11 includes a first surface S1 and a second surface S2, and the second lens 12 includes the third surface S3 and a fourth surface S4. The surfaces S1, S2, S3, and S4 are arranged from the object-side to the image-side of the zoom lens system 100. The first lens 11 is made of glass, while the second lens 12 is made of plastic.

The second lens group 20 includes, in the order from the object-side to the image-side of the zoom lens system 100, a third lens 21 having positive refraction power, a fourth lens 22 having positive refraction power, and a fifth lens 23 having negative refraction power. In the embodiment, the fourth lens 22 and the fifth lens 23 are adhered together to form a single unit. The third lens 21 includes a fifth surface S5 and a sixth surface S6. The fourth lens 22 includes a seventh surface S7 and an eighth surface S8, the fifth lens 23 includes the eighth surface S8 and a ninth surface S9, from the object-side to the image-side of the zoom lens system 100.

The third lens group 30 includes at least one sixth lens 31 having positive refraction power. In the order from the object-side to the image-side of the zoom lens system 100, the sixth lens 31 includes a tenth surface S10 and an eleventh surface S11.

The zoom lens system 100 further includes an aperture stop 40 installed between the second lens group 20 and the third lens group 30. The aperture stop 40 is for adjusting light flux from the second lens group 20 to the third lens group 30. In addition, the aperture stop 40 facilitates uniform light transmission when light passes through the second lens group 20 to correct coma aberrations of the zoom lens system 100. To minimize the manufacture cost and the total length of the zoom lens system 100, the aperture stop 40 can be movable together with the second lens group 20.

The color filter 50 includes, in the order from the object-side to the image-side of the zoom lens system 100, a twelfth surface S12 and a thirteenth surface S13.

The transparent glass sheet 60 includes, in the order from the object-side to the image-side of the zoom lens system 100, a fourteenth surface S14 and a fifteenth surface S15.

The third surface S3, the fourth surface S4, the fifth surface S5, and the sixth surface S6 are aspherical surfaces. The aspherical surfaces are shaped according to the formula:

$$x = \frac{ch^2}{1+\sqrt{1-(k+1)c^2h^2}} + \sum A_i h^i$$

wherein h is a height from the optical axis of the zoom lens system 100 to the aspherical surface, c is a vertex curvature, k is a conic constant, and $A_i$ is i-th order correction coefficients of the aspheric surfaces.

In order to obtain low distortion, good imaging quality and a compact configuration, the zoom lens system 100 satisfies the following conditions:

$0.35 < f2/f3 < 0.7;$     (1)

$1.8 < |f45/Fw| < 3;$     (2)

$0.5 < |f1|/Ft < 0.9;$     (3)

$0.7 < f3/Ft < 1.2;$     (4)

wherein, f1 is a focal length of the first lens group 10; f2 is a focal length of the second lens group 20; f3 is a focal length of the third lens group 30; f45 is a focal length of the attached fourth lens 22, 23; Fw is a focal length of the zoom lens system 100 at a wide angle state; Ft is a focal length of the zoom lens system 100 at a telephoto state. The conditions (1)-(4) can favorably limit the relation between the focal length of every lens groups and the focal length of the zoom lens system 100 to obtain a high resolution. In addition, the telecentric characteristic of the zoom lens system 100 is also maintained. In particular, f2/f3 is equal to 0.46 or 0.6; |f45/Fw| is equal to 2.67 or 2.2; |f1|/Ft is equal to 0.65 or 0.75; f3/Ft is equal to 1.01 or 0.845.

In one embodiment, the zoom lens system 100 further satisfies the following condition:

$$3.3 < (N1+N2) < 3.56; \quad (5)$$

$$16 < (V1-V2) < 28; \quad (6)$$

wherein, N1 is the refractive index of the first lens 11; N2 is the refractive index of the second lens 12; V1 is the Abbe number of the first lens 11; V2 is the Abbe number of the second lens 12. In particular, (N1+N2) is equal to 3.41 or 3.43; (V1-V2) is equal to 19.9 or 23.4.

In one embodiment, the zoom lens system 100 further satisfies the following condition:

$$3.4 < (N4+N5); \quad (7)$$

$$3 < (V4-V5) < 13; \quad (8)$$

wherein, N4 is the refractive index of the fourth lens 22; N5 is the refractive index of the fifth lens 23; V4 is the Abbe number of the fourth lens 22; V5 is the Abbe number of the fifth lens 23. In particular, (N4+N5) is equal to 3.47 or 3.5; (V4-V5) is equal to 7.4 or 4.9.

In one embodiment, the zoom lens system 100 further satisfies the following condition:

$$0.6 < M2/Ft < 0.7; \quad (9)$$

$$0.008 < L12t/Ft < 0.036; \quad (10)$$

wherein, M2 is the longest moving distance of the second lens group 20 from the wide angle state to the telephoto state. Ft is a focal length of the zoom lens system 100 at a telephoto-angle end. L12t is a distance between the second lens 12 of the first lens group 10 and the third lens 21 of the second lens group 20, (a distance between the fourth surface S4 and the fifth surface S5) in the telephoto state. The Conditions (9)-(10) are for reducing the assembly sensitivity of the zoom lens system 100, shortening the length of the zoom lens system 100, and reducing the aberration of the field curvature and spherical aberration in the zoom process. In particular, M2/Ft is equal to 0.66 or 0.639; L12t/Ft is equal to 0.013 or 0.031.

Example diagrams of the zoom lens system 100 will be described below with reference to FIGS. 2-7. It is to be understood that the disclosure is not limited to these examples. The following are symbols used in each exemplary embodiment.

$F_{No}$: F number;
$2\omega$: field angle;
ri: radius of curvature of the surface Si;
Di: distance between surfaces on the optical axis of the surface Si and the surface Si+1;
Ni: refractive index of the surface Si; and
Vi: Abbe constant of the surface Si;
Ki: Secondary curvature of the surface Si.

Tables 1-3 show the specifications of a first exemplary embodiment of the zoom lens system 100.

TABLE 1

| Surface | ri(mm) | Di(mm) | ni | vi | ki |
|---|---|---|---|---|---|
| S1 | 183.61 | 0.56 | 1.80 | 46.5 | — |
| S2 | 5.12 | 1.295 | — | — | — |
| S3 | 7.32 | 1.5 | 1.61 | 26.6 | 1.958681 |
| S4 | 17.66 | D4 | — | — | 1.723569 |
| S5 | 4.21 | 1.04 | 1.69 | 53.2 | −4.338 |
| S6 | −48.88 | 0.067 | — | — | 13.438942 |
| S7 | 7.04 | 1.08 | 1.80 | 39.6 | — |
| S8 | −3.45 | 0.42 | 1.67 | 32.2 | — |
| S9 | 2.52 | 0.6 | — | — | — |
| Aperture stop 40 | infinite | D10 | — | — | — |
| S10 | 80.33 | 1.11 | 1.52 | 64.2 | — |
| S11 | −9.2 | D12 | — | — | — |
| S12 | infinite | 0.3 | 1.52 | 64.2 | — |
| S13 | infinite | 0.4 | — | — | — |
| S14 | infinite | 0.5 | 1.52 | 64.2 | — |
| S15 | infinite | 0.4 | — | — | — |
| Image plane 70 | infinite | — | — | — | — |

TABLE 2

| Aspherical coefficient | Surface | | | |
|---|---|---|---|---|
| | S3 | S4 | S5 | S6 |
| A4 | −1.27552E−03 | −1.38182E−03 | 4.450744E−03 | 5.407506E−04 |
| A6 | −7.57546E−05 | −1.00826E−05 | −1.24638E−04 | 7.8304061E−04 |
| A8 | 4.3581E−06 | 2.042986E−06 | −3.05368E−05 | −4.20781E−04 |
| A10 | −2.04343E−07 | −2.8696E−08 | 3.668547E−05 | 2.428738E−04 |
| A12 | −9.67602E−09 | −3.07425E−09 | −1.3478E−05 | −7.64535E−05 |
| A14 | 1.162156E−09 | −6.58283E−10 | 2.598121E−06 | 1.24551E−05 |
| A16 | −6.32517E−11 | 2.510402E−11 | −2.34183E−07 | −8.53375E−07 |

TABLE 3

| The state of the zoom lens 100 system | f (mm) | $F_{No}$ | FOV (2w) | D4 | D10 | D12 |
|---|---|---|---|---|---|---|
| The wide angle state of the zoom lens system 100 | 4.21 | 3.1 | 77 | 10.77 | 3 | 2.06 |
| The intermediate state of the zoom lens system 100 | 8.91 | 4.8 | 38 | 3.41 | 7.69 | 1.61 |
| The telephoto state of the zoom lens system 100 | 15.96 | 5.9 | 22 | 0.2 | 13.73 | 1.83 |

Figure 2:
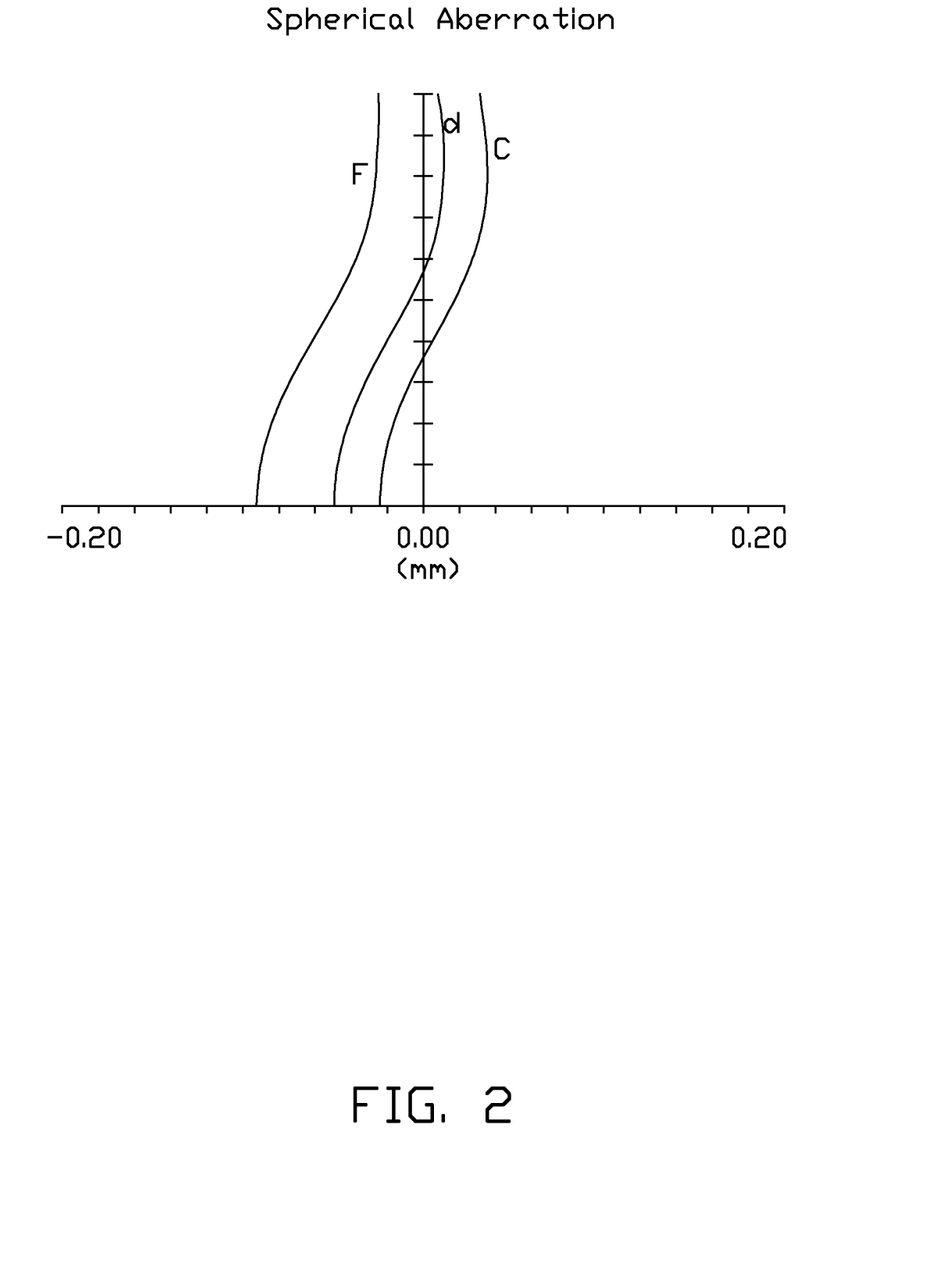
FIGS. 2~4 are graphs respectively showing spherical aberration, field curvature, distortion and lateral chromatic aberration occurring in the zoom lens system, that is in a wide angle state, according to a first exemplary embodiment.
Figure 3:
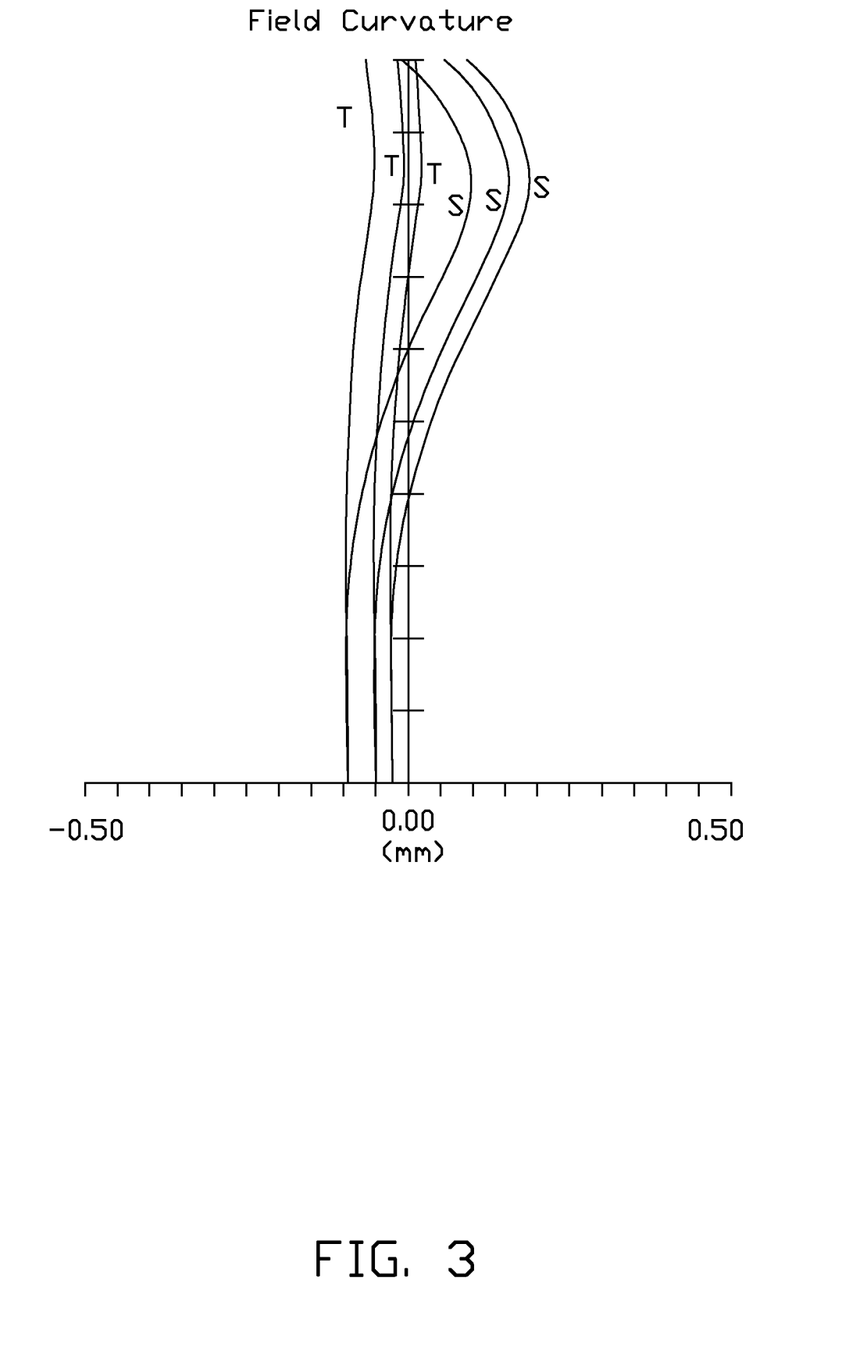
Figure 4:
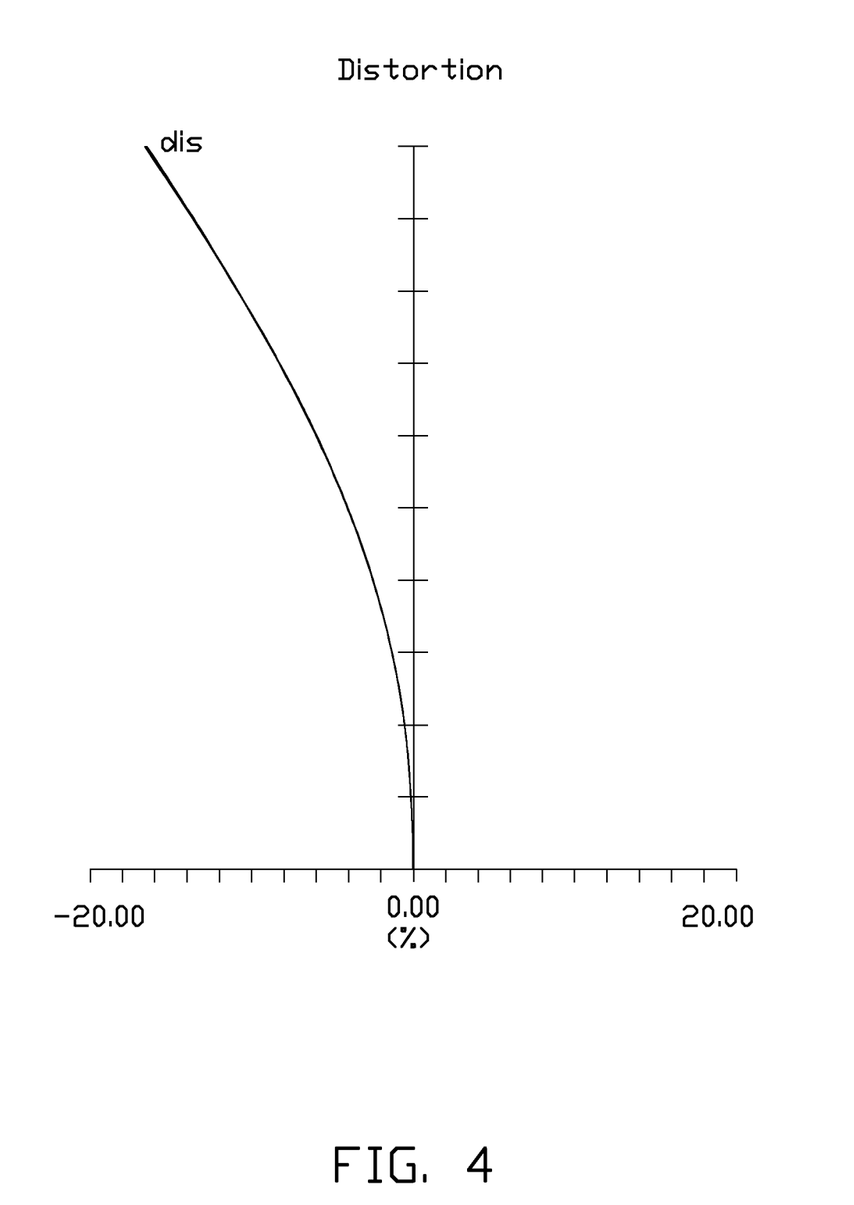
Figure 5:
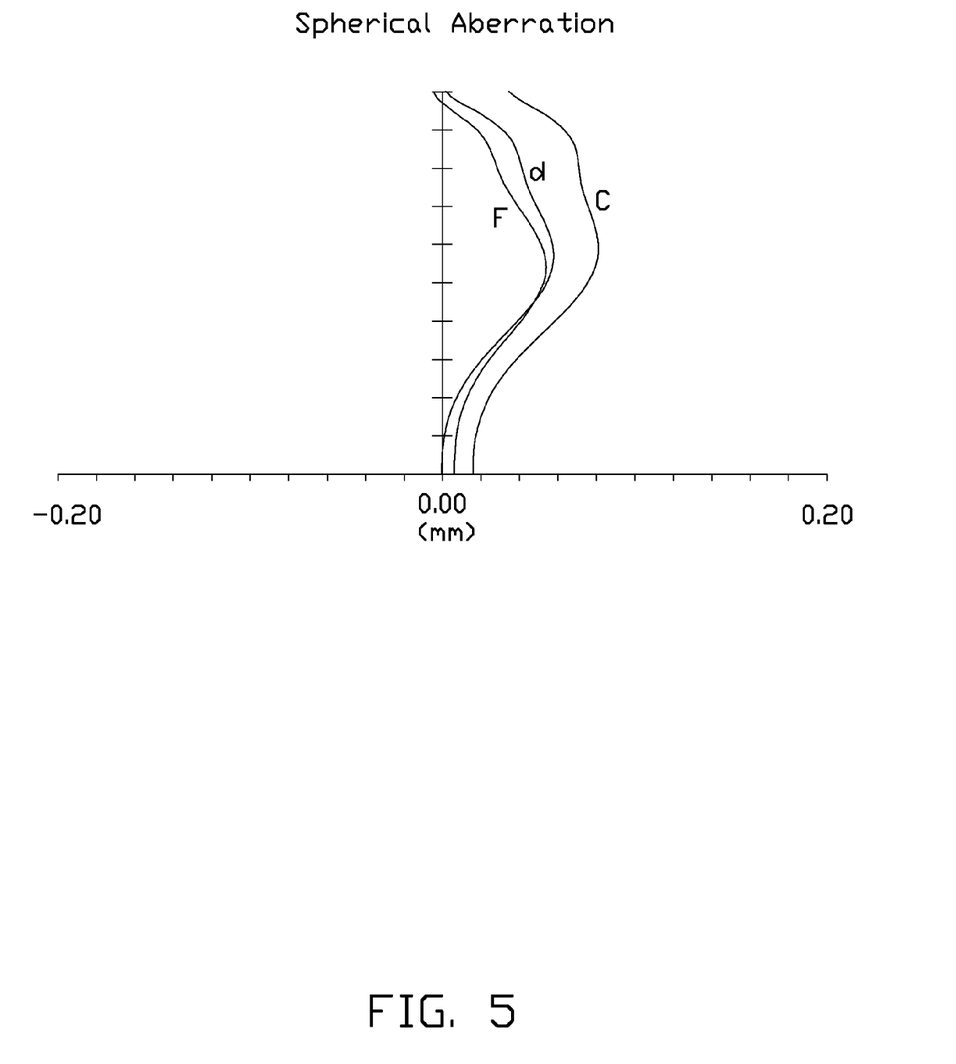
FIGS. 5~7 are graphs respectively showing spherical aberration, field curvature, distortion and lateral chromatic aberration occurring in the zoom lens system, that is in a telephoto state, according to the first exemplary embodiment.
Figure 6:
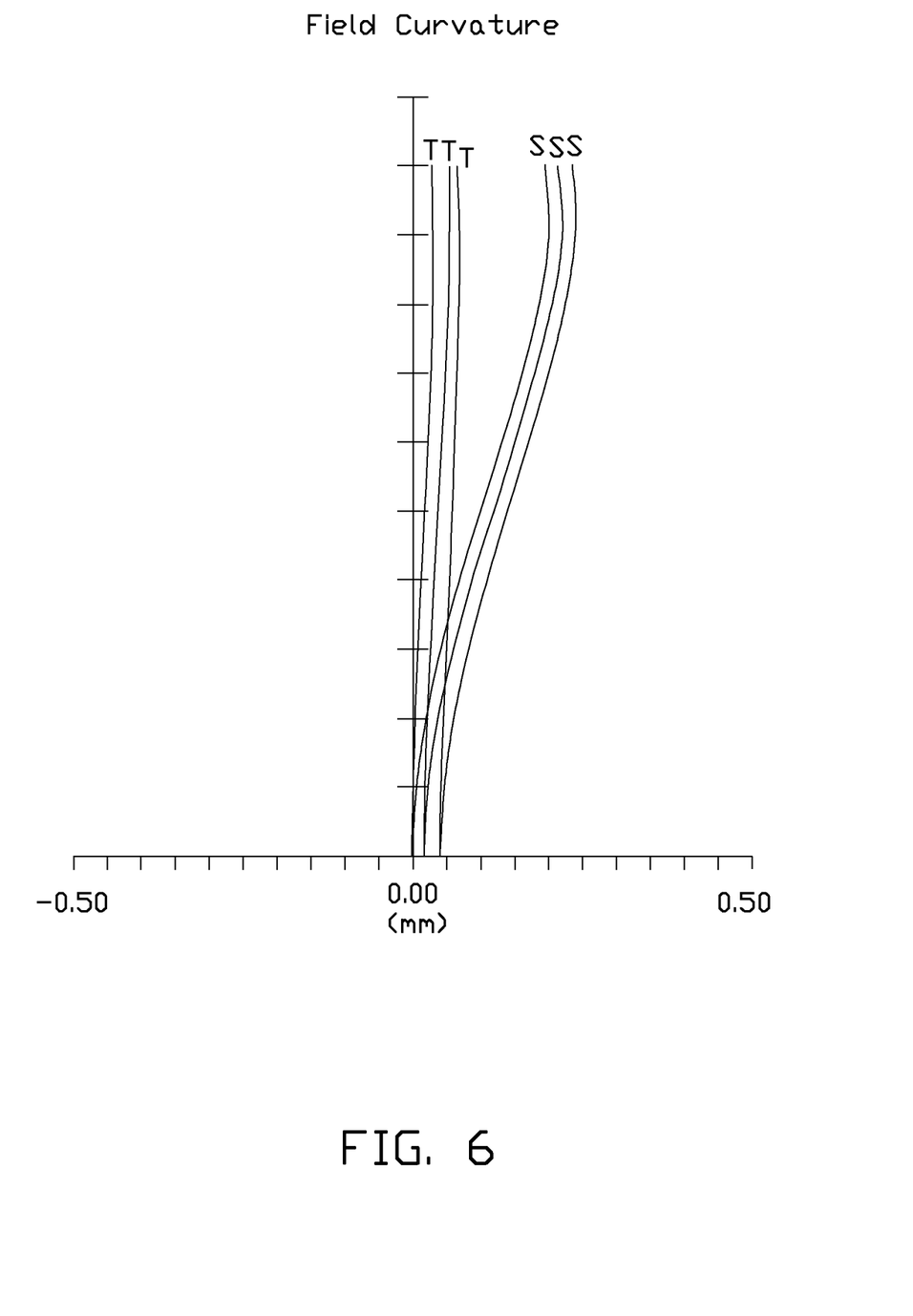
Figure 7:
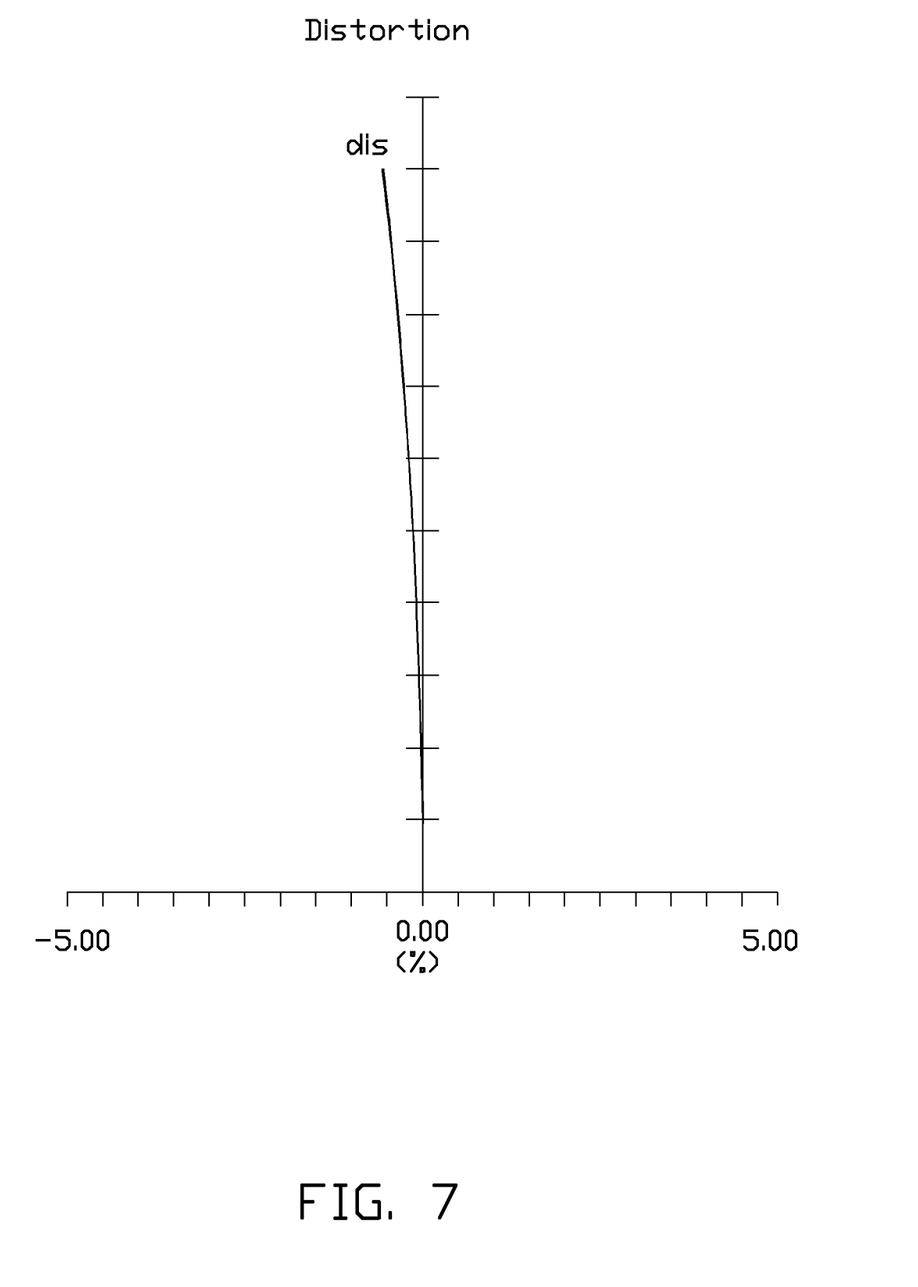

FIGS. 2-4, are graphs of aberrations (spherical aberration, field curvature, distortion, and lateral chromatic aberration) of the first exemplary embodiment of the zoom lens system 100 in the wide angle state. FIGS. 5-7, are graphs of aberrations (spherical aberration, field curvature, distortion, and lateral chromatic aberration) of the first exemplary embodiment of the zoom lens system 100 in the telephoto state. In FIGS. 2, 5, curves are spherical aberration characteristic curves of F light (wavelength: 486.1 nm), d light (wavelength: 587.6 nm) and C light (wavelength: 656.3 nm) of the zoom lens system 100. The spherical aberration of the zoom lens system 100 of the first exemplary embodiment is from −0.2 mm to 0.2 mm. As illustrated in FIGS. 3, 6, the curves T and S are respectively the tangential field curvature curve and the sagittal field curvature curve. The field curvature of the first exemplary embodiment of the zoom lens system 100 is from −0.5 mm to 0.5 mm. In FIGS. 4, 7, the distortion of the first exemplary embodiment of the zoom lens system 100 is from −20% to 20%.

In the first exemplary embodiment, though the overall length of the zoom lens system 100 is reduced, aberrations of the zoom lens system 100 are maintained within an acceptable range. That is, the zoom lens system 100 keeps chromatic aberrations at a minimum while reducing the total length of the zoom lens system 100.

Tables 4-6 show the specifications of a second exemplary embodiment of the zoom lens system 100.

TABLE 4

| Surface | ri(mm) | Di(mm) | Ni | vi | ki |
|---|---|---|---|---|---|
| S1 | 1064.66 | 0.56 | 1.8 | 46.6 | — |
| S2 | 5.496 | 1.295 | — | — | — |
| S3 | 7.414 | 1.5 | 1.63 | 23.2 | 1.914754 |
| S4 | 19.56 | D4 | — | — | 13.244509 |
| S5 | 4.151 | 1.04 | 1.7 | 55.5 | −3.900817 |
| S6 | −48.76 | 0.067 | — | — | 139.105725 |
| S7 | 7.206 | 1.08 | 1.8 | 35 | — |
| S8 | −3.424 | 0.42 | 1.7 | 30.1 | — |
| S9 | 2.542 | 0.6 | — | — | — |
| Aperture stop 40 | infinite | D10 | — | — | — |
| S10 | 41.59 | 1.11 | 1.54 | 59.5 | — |
| S11 | −8.751 | D12 | — | — | — |
| S12 | infinite | 0.3 | 1.52 | 64.2 | — |
| S13 | infinite | 0.4 | — | — | — |
| S14 | infinite | 0.5 | 1.52 | 64.2 | — |
| S15 | infinite | 0.4 | — | — | — |
| Image plane 70 | infinite | — | — | — | — |

TABLE 5

| Aspherical coefficient | Surface | | | |
|---|---|---|---|---|
| | S3 | S4 | S5 | S6 |
| A4 | −7.88601E−04 | −8.01852E−04 | 4.625104E−03 | 4.307587E−04 |
| A6 | −8.56774E−05 | −6.00942E−05 | −1.96446E−04 | 7.756347E−04 |
| A8 | 3.197712E−06 | 1.63155E−06 | −3.92793E−05 | −4.33398E−04 |
| A10 | −1.82479E−07 | 3.666011E−09 | 3.870262E−05 | 2.368944E−04 |
| A12 | −1.13771E−08 | 8.472688E−10 | −1.42504E−05 | −7.75236E−05 |
| A14 | 1.519978E−09 | −4.80514E−10 | 2.619928E−06 | 1.259645E−05 |
| A16 | −5.70713E−11 | 2.091399E−11 | −2.09105E−07 | −7.30624E−07 |

TABLE 6

| The state of the zoom lens 100 system | f (mm) | $F_{No}$ | FOV (2w) | D4 | D10 | D12 |
|---|---|---|---|---|---|---|
| The wide angle state of the zoom lens system 100 | 4.2 | 3.1 | 77 | 12.437 | 2.904 | 2.161 |
| The intermediate state of the zoom lens system 100 | 8.9 | 4.76 | 38 | 3.866 | 7.628 | 1.819 |
| The telephoto state of the zoom lens system 100 | 15.96 | 5.9 | 22 | 0.487 | 14.153 | 1.111 |

Figure 8:
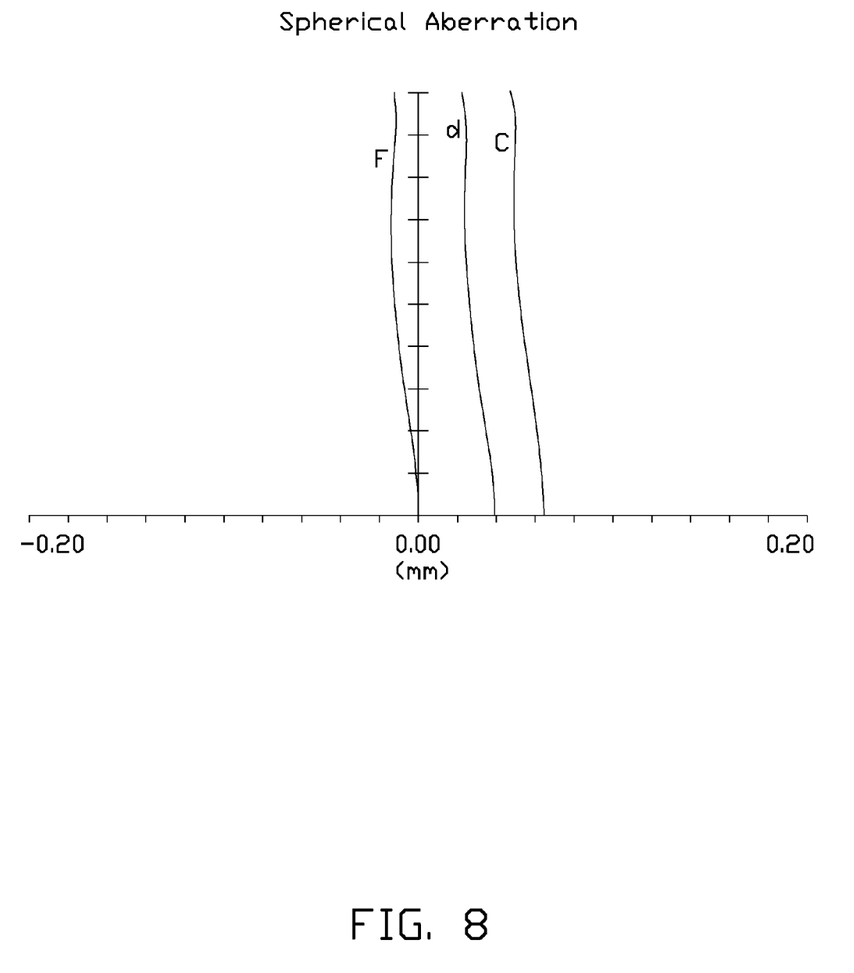
FIGS. 8~10 are graphs respectively showing spherical aberration, field curvature, distortion and lateral chromatic aberration occurring in the zoom lens system, that is in the wide angle state, according to a second exemplary embodiment.
Figure 9:
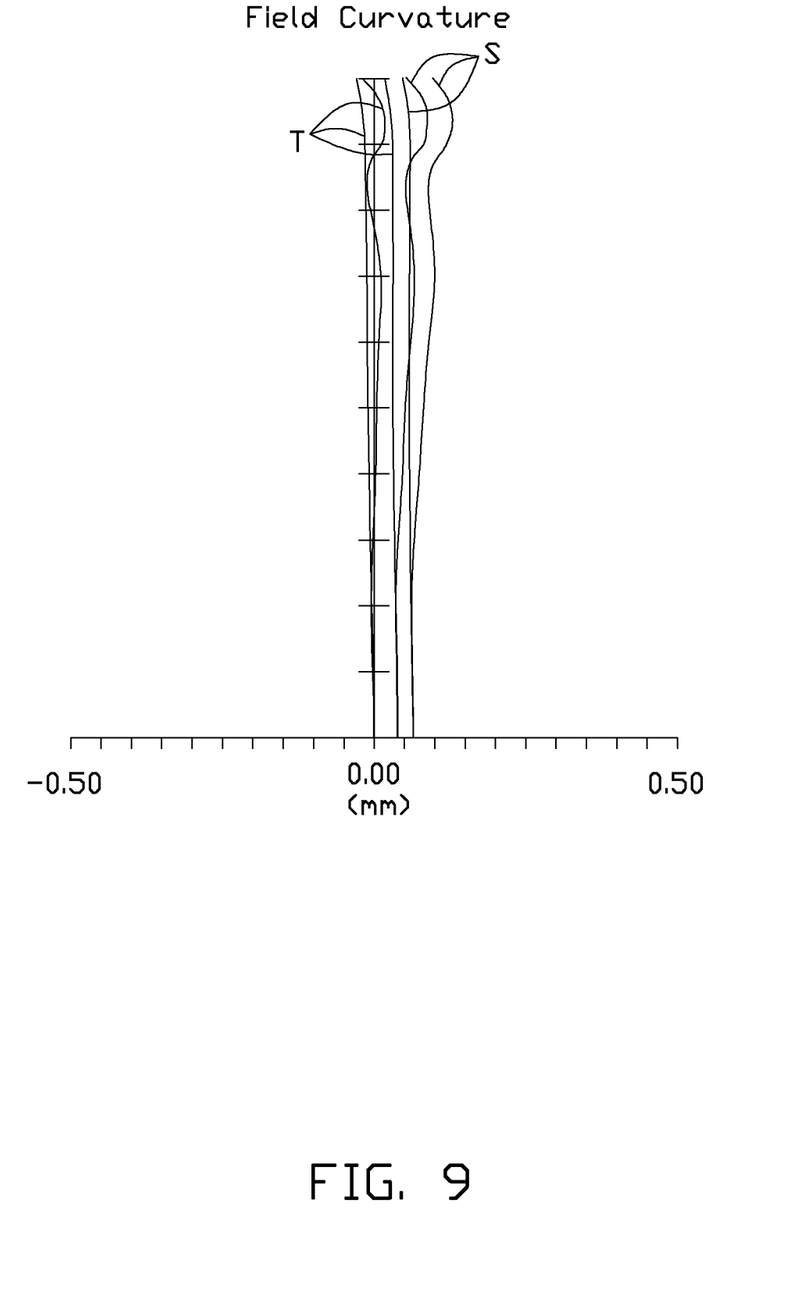
Figure 10:
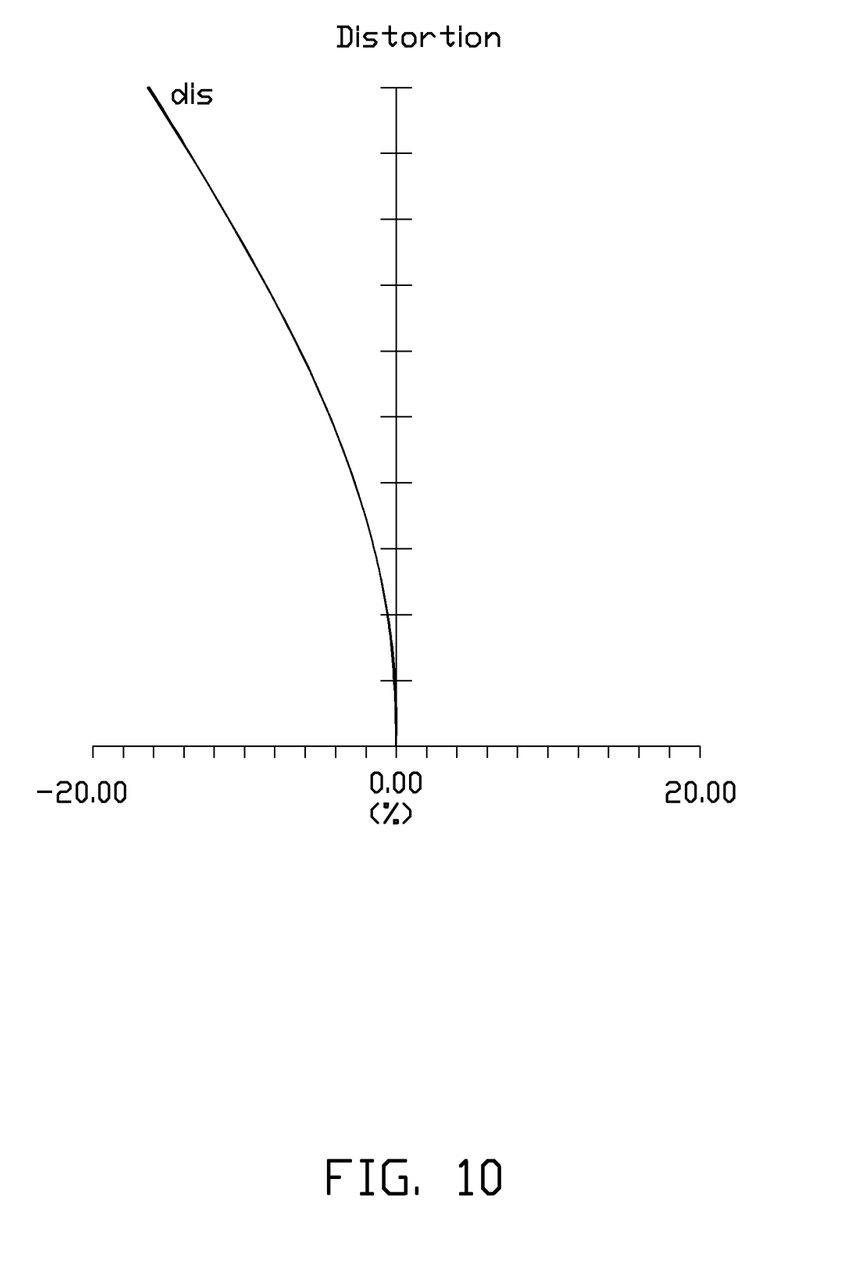
Figure 11:
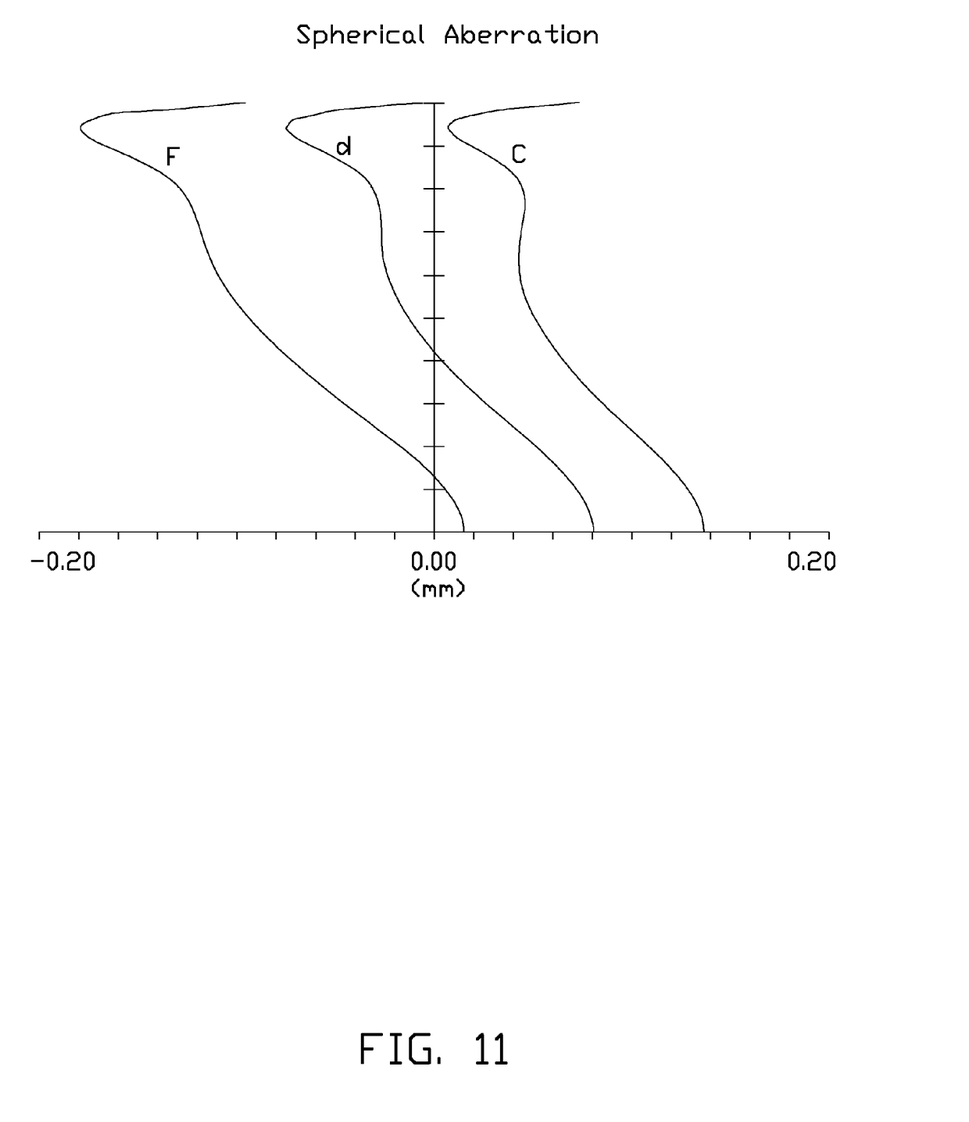
FIGS. 11~13 are graphs respectively showing spherical aberration, field curvature, distortion and lateral chromatic aberration occurring in the zoom lens system, that is in the telephoto state, according to the second exemplary embodiment.
Figure 12:
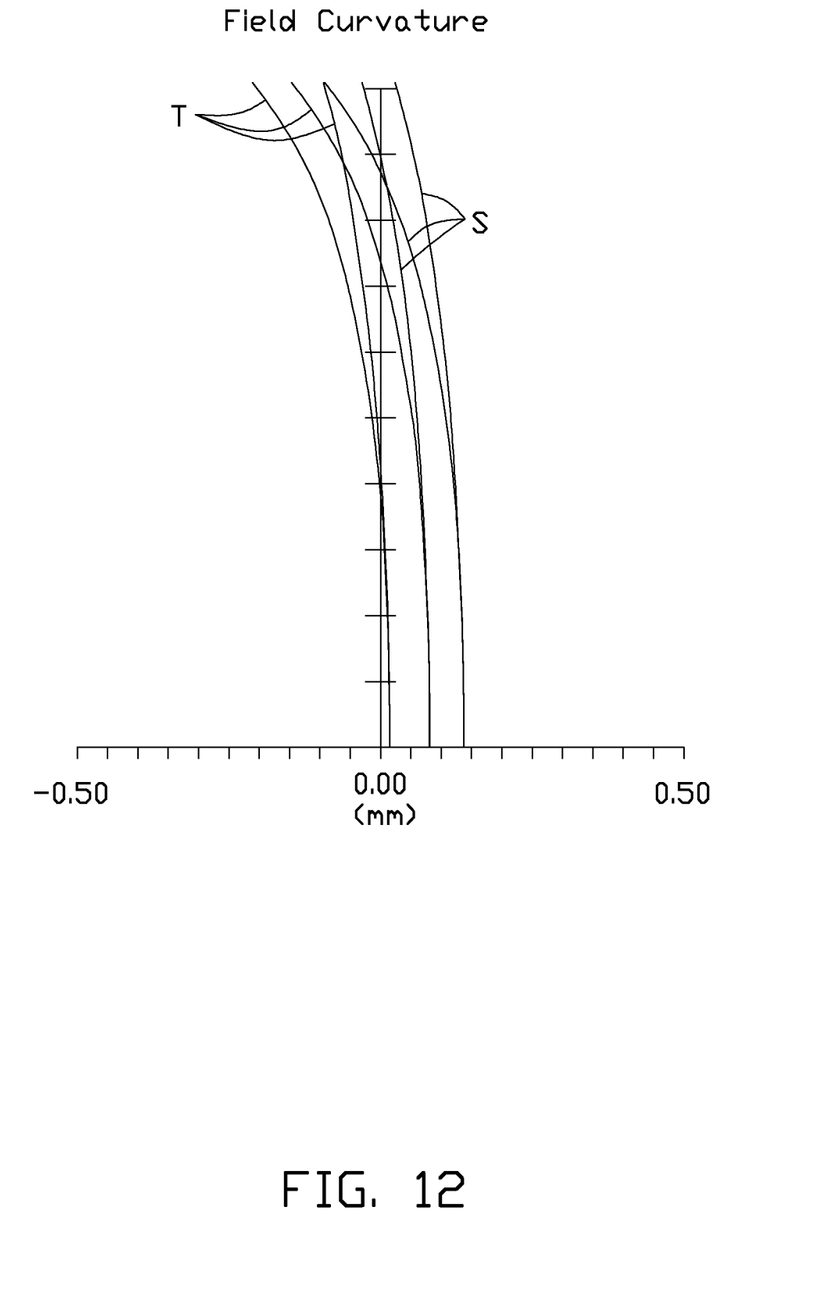
Figure 13:
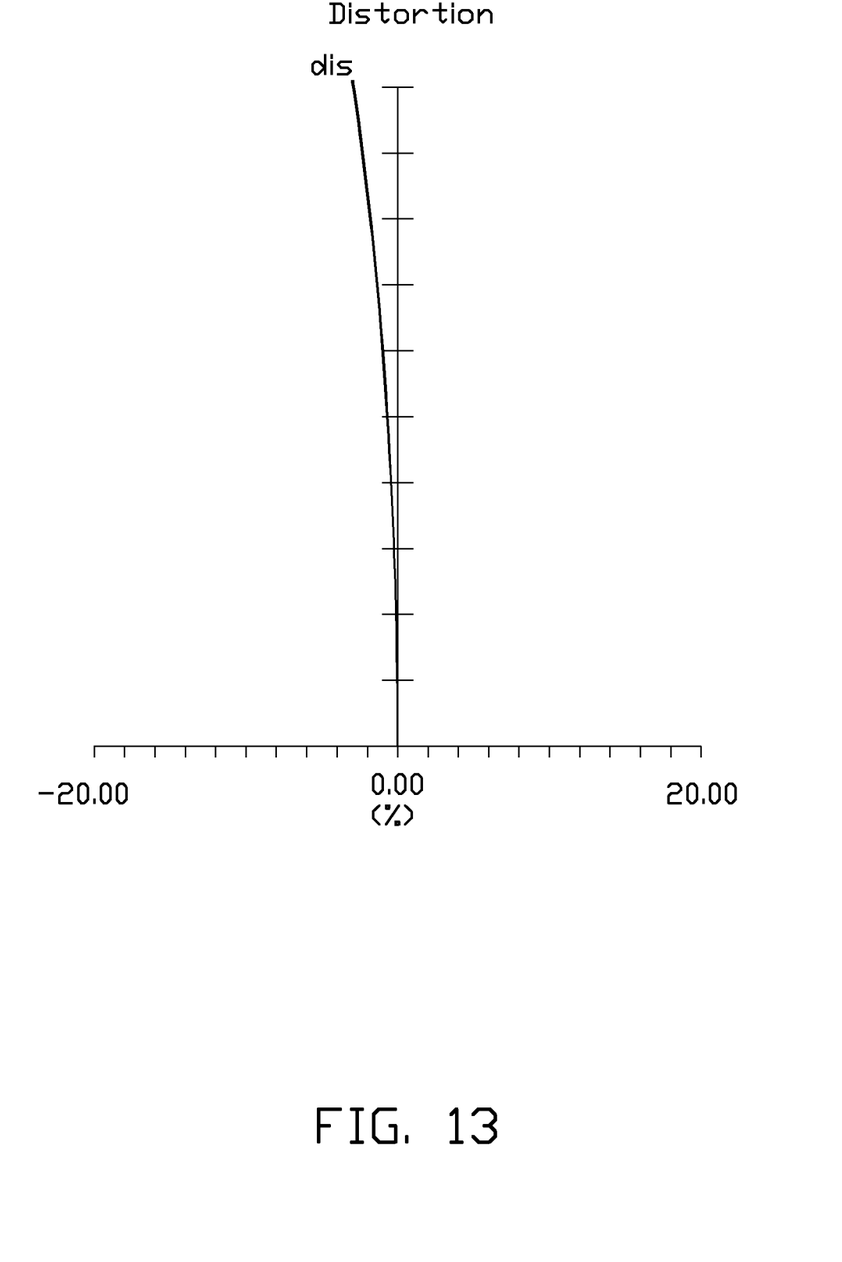

FIGS. 8-10, are graphs of aberrations (spherical aberration, field curvature, distortion, and lateral chromatic aberration) of the second exemplary embodiment of the zoom lens system 100 in the wide angle state. FIGS. 11-13, are graphs of aberrations (spherical aberration, field curvature, distortion, and lateral chromatic aberration) of the second exemplary embodiment of the zoom lens system 100 in the telephoto state. In FIGS. 8, 11, curves are spherical aberration characteristic curves of F light (wavelength: 486.1 nm), d light (wavelength: 587.6 nm) and C light (wavelength: 656.3 nm). The spherical aberration is from −0.2 mm to 0.2 mm. As illustrated in FIGS. 9, 12, the curves T and S are respectively the tangential field curvature curve and the sagittal field curvature curve. The field curvature is from −0.5 mm to 0.5 mm. In FIGS. 10, 13, the distortion is from −20% to 20%.

In the second exemplary embodiment, though the overall length of the zoom lens system 100 is reduced, aberrations of the zoom lens system 100 are maintained within an acceptable range. That is, the zoom lens system 100 keeps chromatic aberrations at a minimum while reducing the total length of the zoom lens system 100.

Aberrations occurring in the zoom lens system 100 are controlled/corrected to an acceptable level, and changes in aberrations are reduced to acceptable levels as well, over the entire zoom range of the zoom lens system 100, accordingly, a high resolution of the zoom lens system 100 is obtained, and maintained over the entire zooming range of the zoom lens system 100.

While certain embodiments have been described and exemplified above, various other embodiments will be apparent to those skilled in the art from the foregoing disclosure. The disclosure is not limited to the particular embodiments described and exemplified, and the embodiments are capable of considerable variation and modification without departure from the scope of the appended claims.

What is claimed is:

1. A zoom lens system, in the order from the object-side to the image-side thereof, comprising:
    a first lens group with negative refraction power, the first lens group comprising a first lens and a second lens;
    a second lens group with positive refraction power, the second lens group comprising a third lens, a fourth lens, and a fifth lens, the fourth lens and the fifth lens are attached together; and
    a third lens group with positive refraction power, the third lens group comprising a sixth lens;
    wherein the zoom lens system satisfies the following conditions:

$0.35 < f2/f3 < 0.7$;

$1.8 < |f45/Fw| < 3$;

$0.5 < |f1|/Ft < 0.9$;

$0.7 < f3/Ft < 1.2;$ $0.6 < M2/Ft < 0.7;$ $3.3 < (N1+N2) < 3.56;$ $16 < (V1-V2) < 28;$ wherein, f1 is a focal length of the first lens group; f2 is a focal length of the second lens group; f3 is a focal length of the third lens group; f45 is a focal length of the attached fourth lens and fifth lens; Fw is a focal length of the zoom lens system in a wide angle state; Ft is a focal length of the zoom lens system in a telephoto state, M2 is the longest moving distance of the second lens group from the wide angle state to the telephoto state; N1 is the refractive index of the first lens; N2 is the refractive index of the second lens; V1 is the Abbe number of the first lens; V2 is the Abbe number of the second lens.

2. The zoom system of claim 1, wherein f2/f3 is equal to 0.46 or 0.6; |f45/Fw| is equal to 2.67 or 2.2; |f1|/Ft is equal to 0.65 or 0.75; f3/Ft is equal to 1.01 or 0.845.

3. The zoom lens system of claim 1, wherein (N1+N2) is equal to 3.41 or 3.43; (V1−V2) is equal to 19.9 or 23.4.

4. The zoom lens system of claim 1, wherein the zoom lens system further satisfies the conditions:

$3.4 < (N4+N5);$ $3 < (V4-V5) < 13;$ wherein, N4 is the refractive index of the fourth lens; N5 is the refractive index of the fifth lens; V4 is the Abbe number of the fourth lens; V5 is the Abbe number of the fifth lens.

5. The zoom lens system of claim 4, wherein (N4+N5) is equal to 3.47 or 3.5; (V4−V5) is equal to 7.4 or 4.9.

6. The zoom lens system of claim 1, wherein the zoom lens system further satisfies the conditions:

$0.008 < L12t/Ft < 0.036;$ wherein, L12t is a distance between the second lens of the first lens group and the third lens of the second lens group, in the telephoto state.

7. The zoom lens system of claim 6, wherein M2/Ft is equal to 0.66 or 0.639; L12t/Ft is equal to 0.013 or 0.031.

8. The zoom lens system of claim 1, wherein the first lens has negative refraction power, and the second lens has positive refraction power.

9. The zoom lens system of claim 8, wherein the first lens is made of glass, while the second lens is made of plastic.

10. The zoom lens system of claim 1, wherein the first, second, third lens groups are movably positioned along the optical axis of the zoom lens system.

11. The zoom lens system of claim 10, further comprising an aperture stop, wherein the aperture stop is positioned between the second lens group and the third lens group.

* * * * *